(12) United States Patent
Qiu (10) Patent No.: US 12,512,722 B1
(45) Date of Patent: Dec. 30, 2025

(54) SHUNT MOTOR FOR CYCLICALLY SWITCHING WATER FLOW CHANNEL ACCORDING TO TIME ANGLE

(71) Applicant: NINGBO SHUNTAI ELECTRICAL APPLIANCE CO., LTD., Ningbo (CN)

(72) Inventor: Wukai Qiu, Ningbo (CN)

(73) Assignee: NINGBO SHUNTAI ELECTRICAL APPLIANCE CO., LTD., Ningbo (CN)

( * ) Notice: Subject to any disclaimer, the term of this patent is extended or adjusted under 35 U.S.C. 154(b) by 0 days.

(21) Appl. No.: 19/234,343

(22) Filed: Jun. 11, 2025

(51) Int. Cl.
  *H02K 7/00* (2006.01)
  *H02K 5/04* (2006.01)
  *H02K 11/00* (2016.01)

(52) U.S. Cl.
  CPC ............... *H02K 7/003* (2013.01); *H02K 5/04* (2013.01); *H02K 11/0094* (2013.01)

(58) Field of Classification Search
  CPC ....... H02K 11/0094; H02K 5/04; H02K 7/003
  See application file for complete search history.

(56) References Cited

U.S. PATENT DOCUMENTS 6,345,645 B1    2/2002  Kenna et al.

FOREIGN PATENT DOCUMENTS

| CN | 202469079 U |   | 10/2012 |   |
|----|-------------|---|---------|---|
| CN | 202812311 U |   | 3/2013  |   |
| CN | 107795725   | * | 3/2018  | ............ H02K 11/20 |
| CN | 207437881 U |   | 6/2018  |   |
| JP | 2004011966 A |  | 1/2004  |   |
| KR | 101681064 B1 |  | 12/2016 |   |

OTHER PUBLICATIONS

Machine translation of CN 107795725; Qiu (Year: 2018).*

* cited by examiner

*Primary Examiner* — Terrance L Kenerly
(74) *Attorney, Agent, or Firm* — Bayramoglu Law Offices LLC (57) ABSTRACT

A shunt motor for cyclically switching a water flow channel according to a time angle includes a motor, where a commutator is arranged on a shunt shaft of the motor, and the commutator includes a high-low level signal carrier, a detection unit, and a PCB control end, the detection unit is configured to detect a high-low level signal, and the PCB control end is configured to converge and transmit detection information to a motor control end, so that a valve opening on the shunt shaft of the motor is cyclically switched to different water inlets of a water tank or a valve body. In the shunt motor, the time angle division thereof is finer, and the quantity of water channels of the corresponding valve body or water tank can be made more, the structure is simplified, and the costs are reduced.

8 Claims, 6 Drawing Sheets

SHUNT MOTOR FOR CYCLICALLY SWITCHING WATER FLOW CHANNEL ACCORDING TO TIME ANGLE

TECHNICAL FIELD

The present invention relates to the field of motors, and in particular, to a shunt motor for cyclically switching a water flow channel according to a time angle.

BACKGROUND

Water channel commutators are often found in cyclic switching of a water channel direction in a water tank or a valve body of foreign dishwashers. At present, time angle control of the commutator mostly adopts a mechanical structure, which has low control precision. The connection between the commutator and the water tank or the valve body is prone to water leakage, which will cause damage to the commutator, the machine will not work, and the customer's floor will be flooded, which reduces user experience. This has a particular safety hazard. A new commutator is developed for this purpose. The commutators currently used in foreign dishwashers have the following shortcomings: 1. A torque output wheel and a motor complete a speed ratio change and torque output through an intermediate transition gear outside the motor. The transition gear is large, low in strength, small in output torque, and loose in structure; 2. The time angle of the torque output wheel is achieved by triggering a micro-touch switch with a cam lever arm. The time angle error controlled by the mechanical structure is large, and the reversing alignment precision of the valve plate outlet is low; 3. The torque output wheel of the commutator uses a seal ring, and the probability of water leakage is high; 4. The commutator does not have water leakage detection at the connection between the output wheel and the water tank, and the machine cannot give an alarm due to water leakage; 5. The commutator motor connection uses a wire to connect to a printed circuit board (PCB), which increases failure points and complicates an assembly process; 6. An RAST (raster anschluss steck technik, grating connector technology) connector socket used in the existing commutator does not have an additional fuse fixing apparatus, so during assembly of the whole machine, the connector is not fully inserted, resulting in tripping, and the qualified rate of the whole machine assembly is reduced.

SUMMARY

In view of this, an objective of the present invention is to provide a shunt motor for cyclically switching a water flow channel according to a time angle, which has high time angle control precision, can detect water leakage and make power off, has good sealing property, is easy to assemble, and has high safety.

The present invention provides a shunt motor for cyclically switching a water flow channel according to a time angle, including a motor, where a commutator is arranged on a shunt shaft of the motor, the commutator includes a high-low level signal carrier, a detection unit, and a PCB control end, the high-low level signal carrier is configured to generate a high-low level, the detection unit is configured to detect a high-low level signal of the high-low level signal carrier, and the PCB control end is configured to converge and transmit detection information to a motor control end, so that a valve opening on the shunt shaft of the motor is cyclically switched to different water inlets of a water tank or a valve body.

In this technical solution, compared with structural division of a conventional mechanical time angle, the detection unit of the shunt motor realizes division of the time angle by collecting high-low level signals through the carrier, and detected information is converged by the PCB control end and transmitted to the motor control end, thereby controlling rotation of the shunt shaft, so that an opening of a valve plate at the top of the shunt shaft corresponds to different channels of the valve body or the water tank, the time angle division of this structure is finer, and the quantity of water channels of the corresponding valve body or water tank can be made more, the structure is simplified, and the costs are reduced.

Preferably, the high-low level signal carrier includes a plurality of grid pieces arranged on a side wall of a lower end of the shunt shaft and distributed in an annular array.

Preferably, the detection unit is a slot type photoelectric switch, and the slot type photoelectric switch is mounted on a side of the bottom of the shunt shaft of the motor, and collects a high-low level signal by using an integrated grid on the high-low level signal carrier.

In this technical solution, time angle division is implemented by combining an integrated grid with a photoelectric switch, a structure is novel and practical, and precision is high.

Preferably, the PCB control end is mounted on a side of the detection unit, so as to facilitate assembly, a proper layout, and a miniaturized overall structure design.

Preferably, a water storage tank is arranged at a mounting position of the PCB control end, a water leakage detection contact and an overflow port are arranged at a specific height in the water storage tank, and the water leakage detection contact is electrically connected to the PCB control end; and when water leakage occurs, water in the water storage tank is able to conduct two water leakage detection contacts and generate an alarm signal.

In this technical solution, when the bottom of the shunt shaft leaks water or the seal ring fails and causes water leakage, water flows into the water storage tank through a mounting cover of the motor. When the water level reaches a specific height, the water leakage detection contact reacts, the level signal changes, and the PCB control end gives an alarm. In addition, when a water leakage quantity unit time is relatively large, water above the water detection level is discharged from the overflow port, so as to protect safety of the commutator.

Preferably, a shunt shaft cover is arranged above the carrier at the bottom of the shunt shaft of the motor, and a drain port is arranged on the shunt shaft and is connected to the water storage tank through a flow channel, where the flow channel may be specifically a cofferdam groove of the mounting cover and communicates with the water storage tank through the cofferdam groove.

In this technical solution, the drain port is provided in the shunt shaft cover, and water can enter the water storage tank through the drain port via the cofferdam groove on the mounting cover, so as to protect safety of the commutator.

Preferably, a connection between the shunt shaft of the motor and the valve body or the water tank is a step shaft, and the two step shafts are respectively corresponding to one large seal ring and one small seal ring, thereby improving airtightness, ensuring use stability, and prolonging a service life.

Preferably, a connector socket is arranged on both the PCB control end and the motor control end, and an RAST connector is mounted in the connector socket, so as to implement an electrical connection to the PCB control end or the motor control end, and an integrated hinge flap lock is mounted in the connector socket, so as to ensure that a plug is inserted and completely locked again by using the lock when the plug is not safely inserted into the socket, so as to ensure a full connection to the RAST connector and prevent loosening.

Preferably, a buckle may be arranged in the connector socket, and after the RAST connector is inserted into the connector socket, fastening is implemented by using the buckle, so as to ensure that when the RAST connector is fully inserted, looseness thereof is prevented. A structure thereof is more compact, and a connection is more convenient. The buckle is an elastic buckle, which also facilitates loading and unloading of the RAST connector.

Preferably, the motor control end is assembled with a coil frame pin of the motor, a welding pin is connected, an assembly process is simple, connection is stable, and fault points become fewer.

Preferably, the motor includes a mounting base and a rear cover, and the mounting base and the rear cover cooperate to use an inner-guided hidden reverse hook.

According to the shunt motor for cyclically switching a water flow channel according to a time angle in the present invention, compared with conventional structure division of a mechanical time angle, a detection unit of the shunt motor collects a high-low level signal by using a carrier to implement time angle division, and detection information is converged by a PCB control end and transferred to a motor control end, so as to control rotation of the shunt shaft, so that an opening of a valve plate at a top of the shunt shaft is corresponding to different channels of a valve body or a water tank, time angle division of this structure is finer, and a larger quantity of water channels of the corresponding valve body or water tank can also be further obtained, the structure is simplified, and costs are reduced. Through cooperation between an integrated grid and a photoelectric switch, a time angle is divided, the structure is novel and practical, and precision is high. The PCB control end is mounted on one side of the detection unit, and is easy to assemble, and this has a proper layout and facilitates a miniaturized overall structure design. A water storage and water leakage detection structure is arranged. When water leakage occurs, an alarm can be generated to improve use safety. In the present invention, the shunt motor for circularly switching a water flow channel according to a time angle is high in time angle control precision and has a water leakage detection function. In addition, the shunt motor has a compact structure, convenient assembly, high use safety, and a good use effect.

1. motor; 1.1. valve body; 1.2. commutator; 1.21. grid piece; 1.22. photoelectric switch; 1.23. PCB control end; 1.3. shunt shaft shield; 1.4. shunt shaft; 1.5. seal ring; 1.6. shunt shaft cover; 1.7. mounting base; 1.8. drain port; 1.9. water leakage detection contact; 2. coil frame 2.3. rear cover; 3. water storage tank; 3.1. overflow port; 4. hinge flap lock; 4'. buckle; 5. reverse hook.

DETAILED DESCRIPTION OF THE EMBODIMENTS

The following describes the embodiments of the present invention in detail with reference to the accompanying drawings.

Embodiment 1

Figure 1:
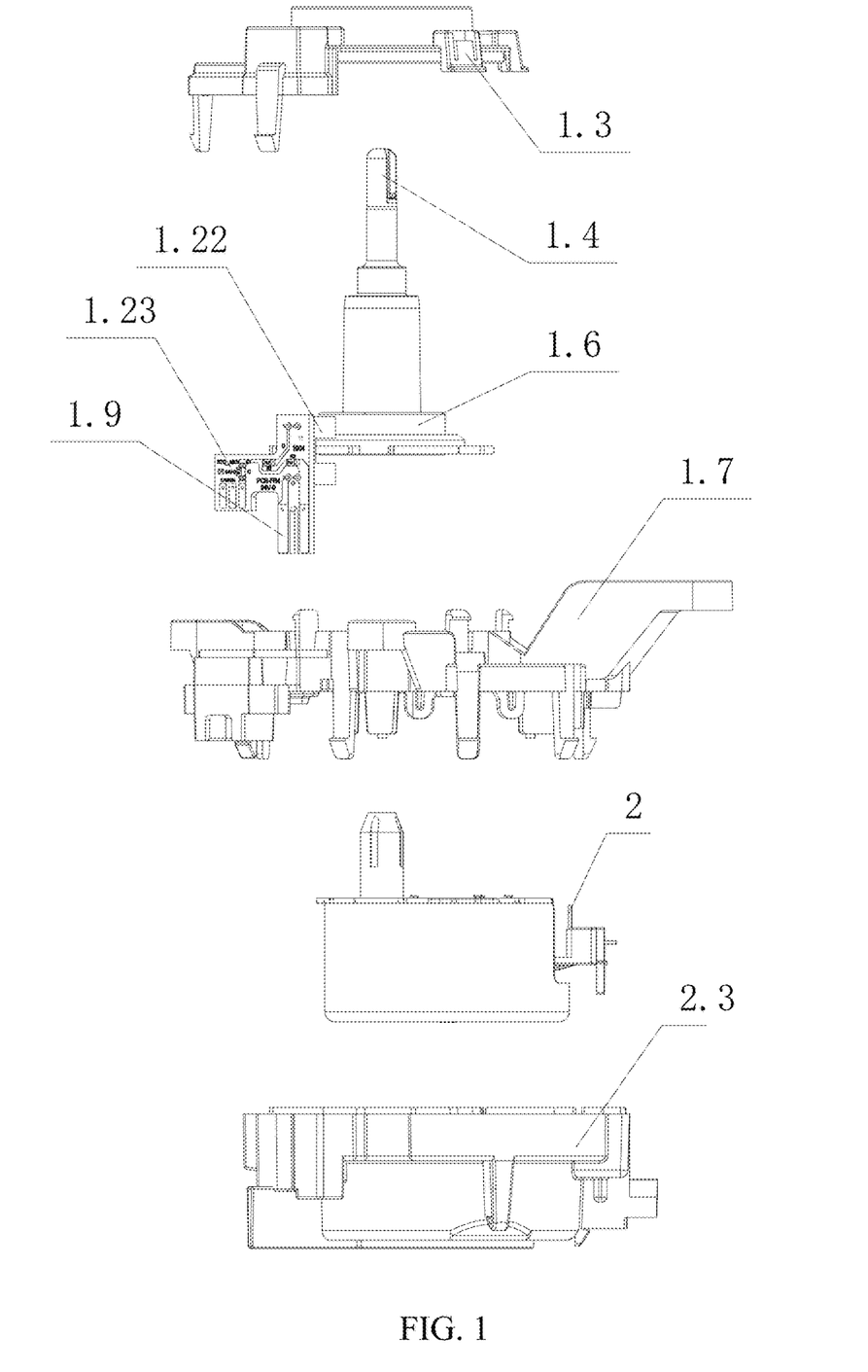
FIG. 1 is a schematic diagram of an explosion structure according to an embodiment of the present invention.
Figure 2:
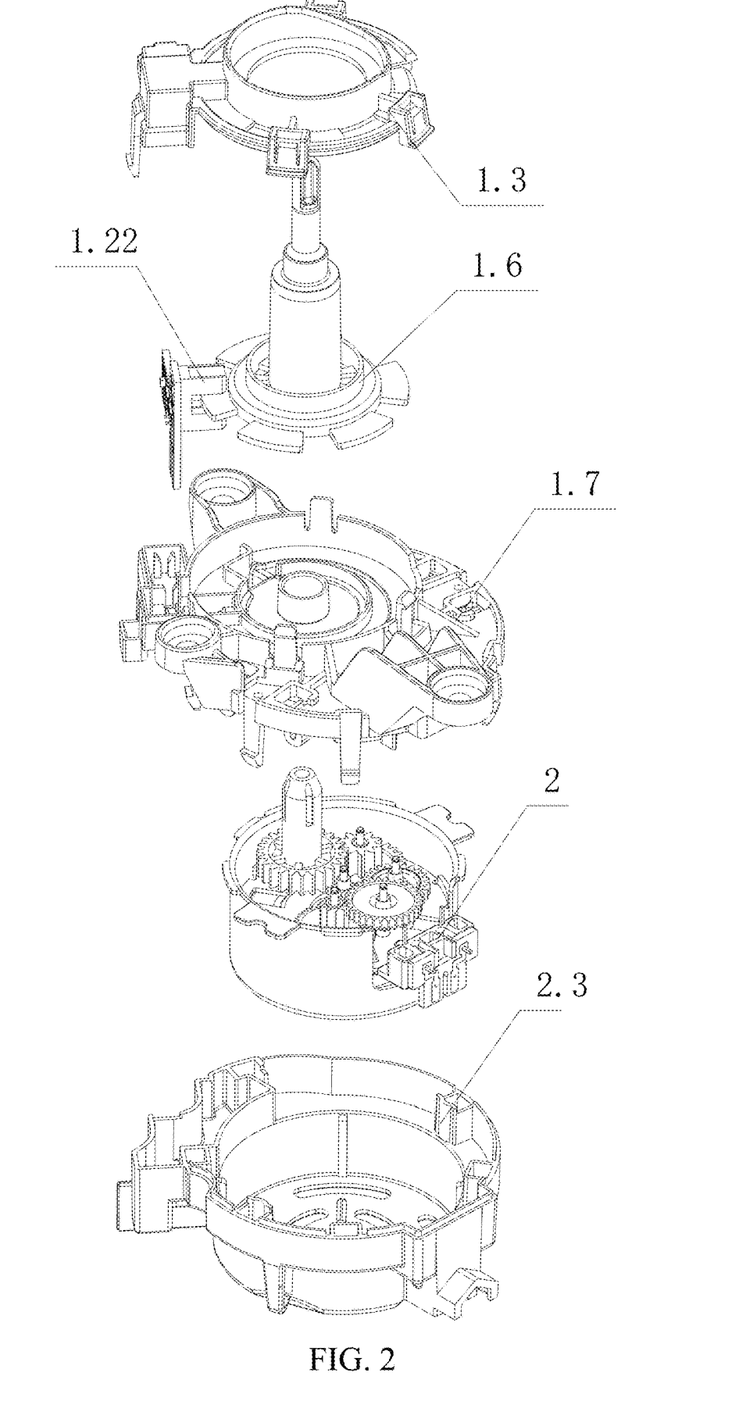
FIG. 2 is a schematic diagram of an overall structure according to an embodiment of the present invention.
Figure 3:
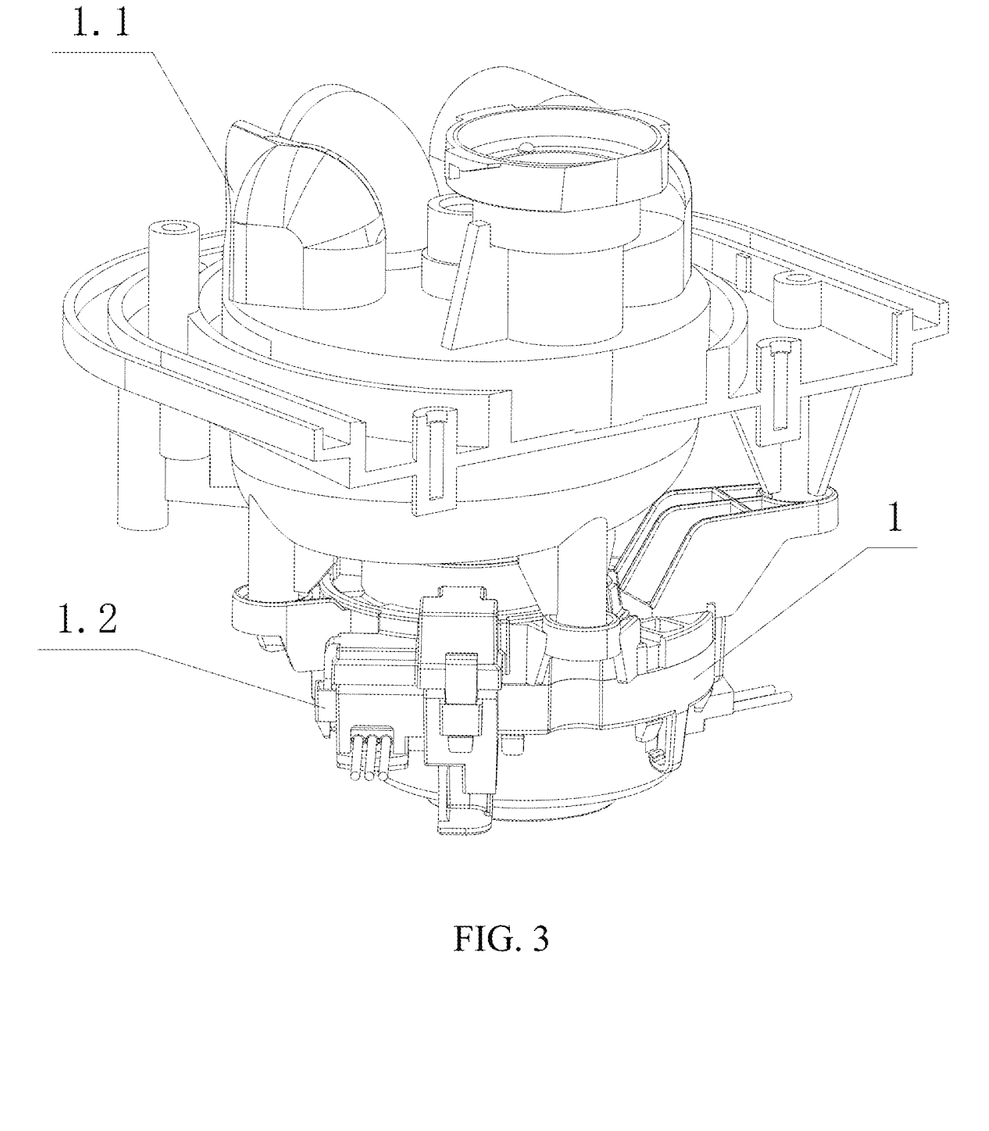
FIG. 3 is a schematic diagram of an overall structure of a connection to a valve body according to an embodiment of the present invention.

As shown in FIG. 1, FIG. 2, and FIG. 3, a shunt motor 1 for cyclically switching a water flow channel according to a time angle includes a shunt shaft shield 1.3 at a top of a shunt shaft, a mounting base 1.7, a coil frame 2, and a rear cover 2.3. A commutator 1.2 is arranged on the shunt shaft 1.4 of the motor 1. The commutator 1.2 includes a high-low level signal carrier, a detection unit, and a PCB control end. The high-low level signal carrier specifically includes a plurality of grid pieces 1.21 arranged at a side wall of a lower end of the shunt shaft and distributed in an annular array, and is configured to generate a high-low level, and the detection unit is configured to detect a high-low level signal formed by the high-low level signal carrier. In this embodiment, the detection unit is specifically configured as a slot type photoelectric switch 1.22, which is mounted on a side of a bottom of the shunt shaft 1.4 of the motor 1. A detection slot of the slot type photoelectric switch is located on a rotation path of the grid piece, that is, the grid piece can pass through the detection slot on the slot type photoelectric switch, so as to form a high-low level. The PCB control end collects a high-low level signal by using an integrated grid, and converges and transmits detection information to a motor control end, so that a valve opening on the shunt shaft 1.4 of the motor 1 is cyclically switched to different water inlets of a water tank or a valve body 1.1, where the PCB control end is mounted on one side of the detection unit.

In this technical solution, compared with structural division of a conventional mechanical time angle, the detection unit of the shunt motor 1 realizes division of the time angle by collecting high-low level signals through the carrier, and detected information is converged by the PCB control end 1.23 and transmitted to the motor control end, thereby controlling rotation of the shunt shaft 1.4, so that an opening of a valve plate at the top of the shunt shaft 1.4 corresponds to different channels of the valve body 1.1 or the water tank, the time angle division of this structure is finer, and the quantity of water channels of the corresponding valve body 1.1 or water tank can be made more, the structure is simplified, and the costs are reduced.

Figure 5:
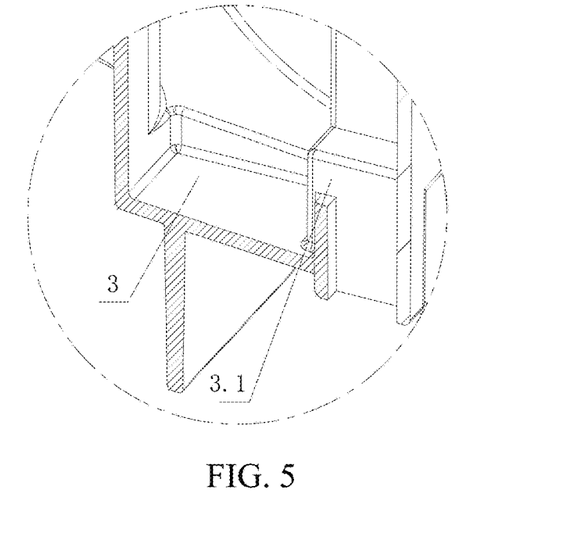
FIG. 5 is a schematic structural diagram of a water storage tank according to an embodiment of the present invention.

As shown in FIG. 5, a water storage tank 3 is arranged at a mounting position of the PCB control end 1.23, a water leakage detection contact 1.9 and an overflow port 3.1 are arranged at a specific height in the water storage tank 3, and the water leakage detection contact 1.9 is electrically connected to the PCB control end 1.23 to detect whether water is leaking. There are two water leakage detection contacts 1.9. When water leakage occurs, water in the water storage tank can conduct the two water leakage detection contacts, so as to generate an alarm signal, give an alarm, implement water leakage detection, and improve use safety.

When the bottom of the shunt shaft 1.4 leaks water or the seal ring 1.5 fails and causes water leakage, water flows into the water storage tank 3 through a mounting cover of the motor 1. When the water level reaches a specific height, the water leakage detection contact reacts, the level signal changes, and the PCB control end 1.23 gives an alarm. In addition, when a water leakage quantity is relatively large in unit time, water above the water detection level is discharged from the overflow port 3.1, so as to control the water level in the water storage tank 3 and protect safety of the commutator 1.2.

Figure 4:
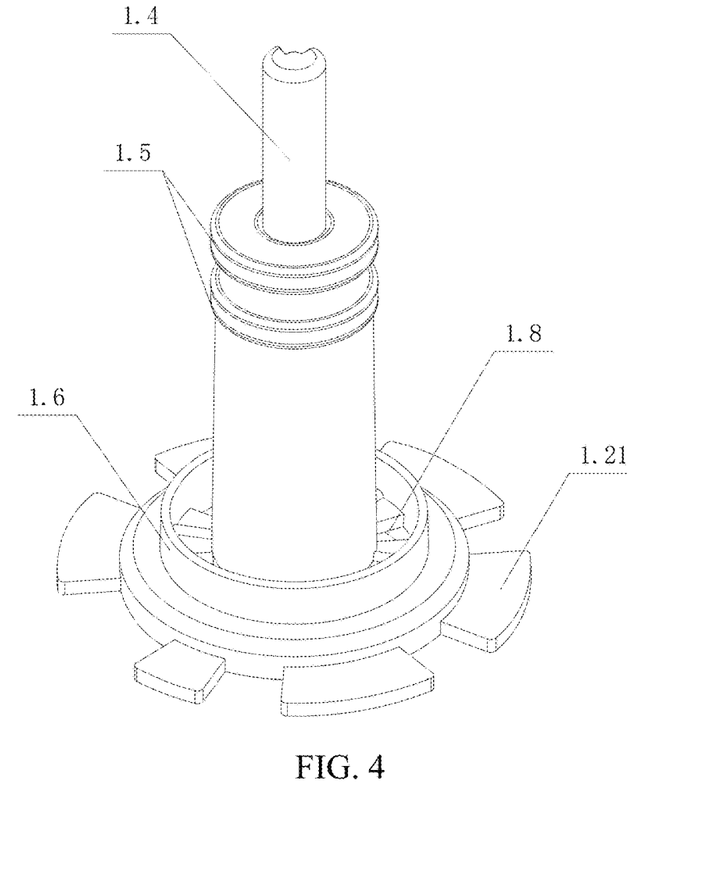
FIG. 4 is a schematic structural diagram of a shunt shaft according to an embodiment of the present invention.

As shown in FIG. 4, a shunt shaft cover 1.6 is arranged above the carrier at the bottom of the shunt shaft 1.4 of the motor 1, and a drain port 1.8 is arranged on the shunt shaft 1.6 and communicates with the water storage tank 3 through a flow channel, which can drain leaked water into the water storage tank, where the flow channel may be specifically a cofferdam groove of the mounting cover and communicates with the water storage tank through the cofferdam groove.

The drain port 1.8 is provided in the shunt shaft cover 1.6, and water can enter the cofferdam groove on the mounting cover through the drain port 1.8 and finally enter the water storage tank 3, so as to guide leaked water to be discharged and protect safety of the commutator 1.2.

As shown in FIG. 4, a connection between the shunt shaft 1.4 of the motor 1 and the valve body 1.1 or the water tank is a step shaft, and the two step shafts are respectively corresponding to one large seal ring 1.5 and one small seal ring 1.5, so as to improve airtightness.

Figure 6A:
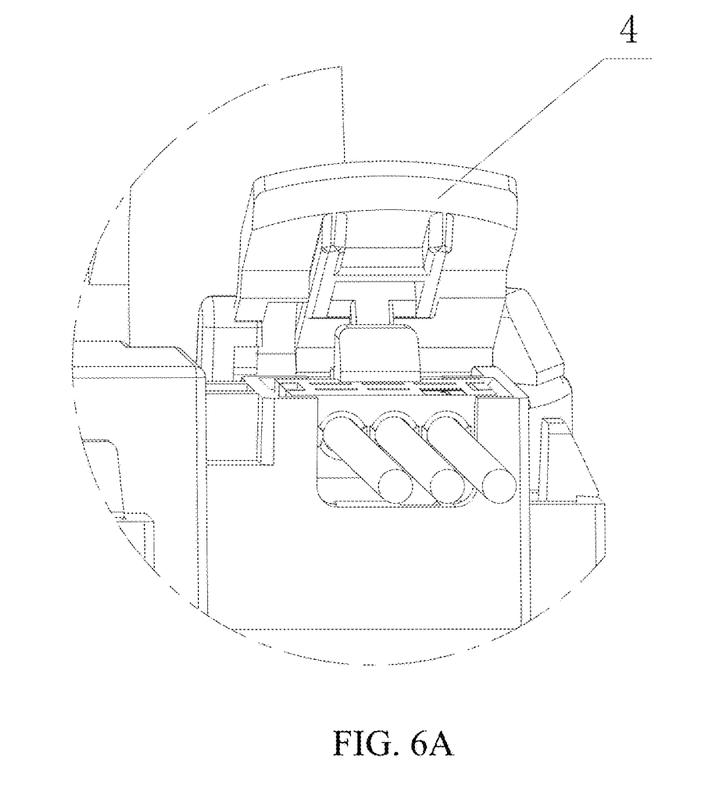
FIG. 6A is a schematic structural diagram of a hinge flap lock according to an embodiment of the present invention.

As shown in FIG. 1 and FIG. 6A, an RAST connector is arranged on both the PCB control end 1.23 and the motor control end. Specifically, a connector socket for mounting the RAST connector is arranged on both the PCB control end and the motor control end, and the RAST connector is inserted into the connector socket, so as to implement an electrical connection. In addition, an integrated hinge flap lock 4 is mounted in the connector socket, so as to ensure that a plug is inserted and completely locked again by using the lock when the plug is not safely inserted into the socket, so as to ensure a full connection to the RAST connector and prevent loosening.

Figure 6B:
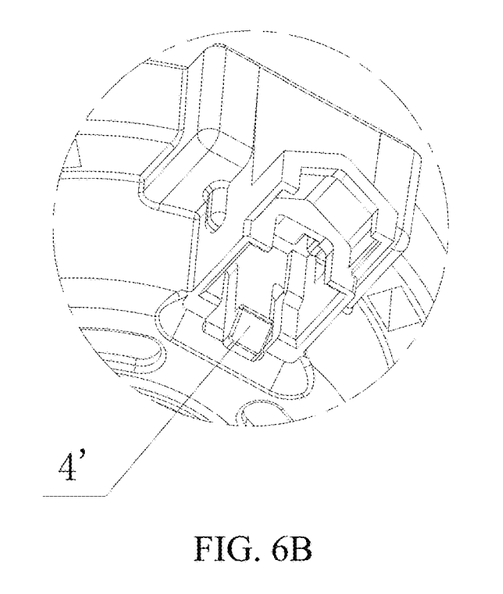
FIG. 6B is a schematic structural diagram of a buckle according to an embodiment of the present invention.

The lock of the RAST connector may alternatively use a buckle 4'. Referring to FIG. 6B, specifically, a connector socket for mounting the RAST connector is arranged on both the PCB control end and the motor control end, and the RAST connector is inserted into the connector socket, so as to implement an electrical connection. In addition, a buckle is arranged in the connector socket, and after the RAST connector is inserted into the connector socket, fastening is implemented by using the buckle, so as to ensure that when the RAST connector is fully inserted, looseness thereof is prevented. A structure thereof is more compact, and a connection is more convenient. The buckle is an elastic buckle, which also facilitates loading and unloading of the RAST connector.

In addition, the motor control end is assembled with a coil frame pin 2 of the motor 1, a welding pin is connected, an assembly process is simple, and fault points become fewer.

Figure 7:
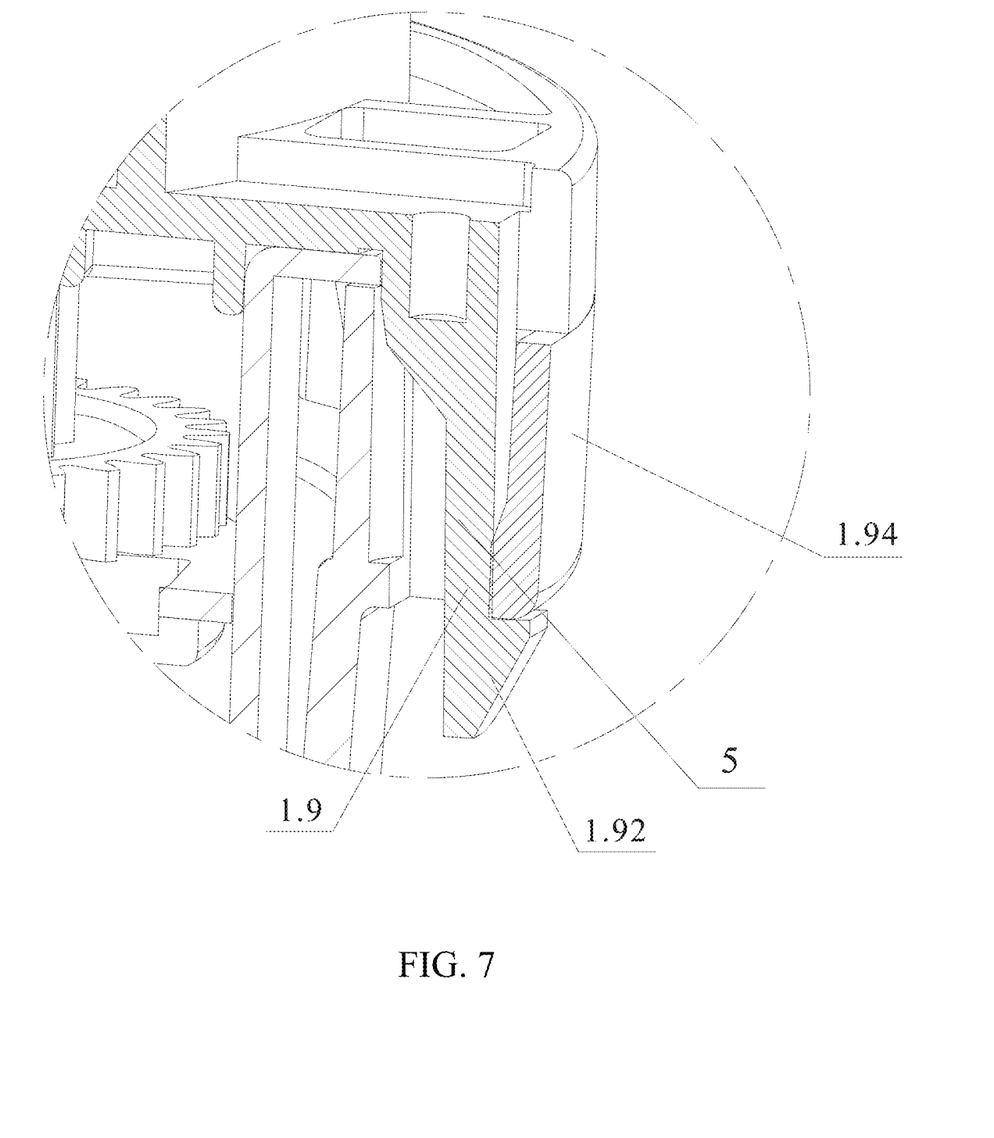
FIG. 7 is a structural diagram of a reverse hook according to an embodiment of the present invention.

As shown in FIG. 7, in this application, the motor 1 includes a mounting base 1.7 and a rear cover 2.3. The mounting base 1.7 and the rear cover 2.3 cooperate with each other by using an inner-guided hidden reverse hook 5. Specifically, an elastic buckle is arranged on an edge of the mounting base, there are a plurality of elastic buckles 1.9 arranged in a downward direction, and an end portion of the elastic buckle is provided with a triangular buckle portion 1.92. Correspondingly, a buckle groove 1.94 corresponding to the elastic buckle is arranged on an edge of the rear cover 3, the elastic buckle can be inserted into the buckle groove, and a lower end portion of the buckle groove can be hooked by the buckle portion of the elastic buckle to form fastening, so that it is easy to mount and secure, as well as easy to remove and maintain.

According to the shunt motor for cyclically switching a water flow channel according to a time angle in the present invention, compared with conventional structure division of a mechanical time angle, a detection unit of the shunt motor collects a high-low level signal by using a carrier to implement time angle division, and detection information is converged by a PCB control end and transferred to a motor control end, so as to control rotation of the shunt shaft, so that an opening of a valve plate at a top of the shunt shaft is corresponding to different channels of a valve body or a water tank, time angle division of this structure is finer, and a larger quantity of water channels of the corresponding valve body or water tank can also be further obtained, the structure is simplified, and costs are reduced. Through cooperation between an integrated grid and a photoelectric switch, a time angle is divided, the structure is novel and practical, and precision is high. The PCB control end is mounted on one side of the detection unit, and is easy to assemble, and this has a proper layout and facilitates a miniaturized overall structure design. A water storage and water leakage detection structure is arranged. When water leakage occurs, an alarm can be generated to improve use safety. In the present invention, the shunt motor for circularly switching a water flow channel according to a time angle is high in time angle control precision and has a water leakage detection function. In addition, the shunt motor has a compact structure, convenient assembly, high use safety, and a good use effect.

The foregoing descriptions are merely preferred implementations of the present invention. It should be noted that a person of ordinary skill in the art may make some improvements and embellishes without departing from the principles of the present invention. These improvements and embellishes shall also be considered as being within the protection scope of the present invention.

The invention claimed is:

1. A shunt motor for cyclically switching a water flow channel according to a time angle, comprising a motor, wherein a commutator is arranged on a shunt shaft of the motor, the commutator comprises a high-low level signal carrier, a detection unit, and a printed circuit board (PCB) control end, the high-low level signal carrier is configured to generate a high-low level, the detection unit is configured to detect a high-low level signal of the high-low level signal carrier, and the PCB control end is configured to converge and transmit detection information to a motor control end, so that a valve opening on the shunt shaft of the motor is cyclically switched to different water inlets of a water tank or a valve body;

a water storage tank is arranged at a mounting position of the PCB control end, a water leakage detection contact and an overflow port are arranged at a specific height in the water storage tank, and the water leakage detection contact is electrically connected to the PCB control end; and when water leakage occurs, water in the water storage tank is allowed to conduct two water leakage detection contacts and generate an alarm signal; and a shunt shaft cover is arranged at a bottom of the shunt shaft of the motor and on the high-low level signal carrier, a water drain port is arranged on the shunt shaft, and the water drain port communicates with the water storage tank through a flow channel and is allowed to drain water into the water storage tank, wherein the motor further comprises a mounting base and a rear cover, the mounting base has a plurality of elastic buckles arranged in a downward direction on an edge thereof, each elastic buckle having a triangular buckle portion at an end thereof, and the rear cover has a plurality of buckle grooves on an edge thereof, each buckle groove being configured to receive a corresponding triangular buckle portion of an elastic buckle, such that when the mounting base and the rear cover are assembled, the triangular buckle portions engage with the buckle grooves to fasten and secure the mounting base and the rear cover together.

2. The shunt motor according to claim 1, wherein the high-low level signal carrier comprises a plurality of grid pieces arranged on a side wall of a lower end of the shunt shaft and distributed in an annular array.

3. The shunt motor according to claim 1, wherein the detection unit is a slot type photoelectric switch, and the slot type photoelectric switch is mounted on a side of the bottom of the shunt shaft, and collects the high-low level signal by using an integrated grid on the high-low level signal carrier.

4. The shunt motor according to claim 1, wherein a connection between the shunt shaft and the valve body or the water tank is a step shaft, wherein the step shaft corresponds to one large seal ring and one small seal ring, respectively.

5. The shunt motor according to claim 1, wherein both the PCB control end and the motor control end are provided with a connector socket for mounting an RAST (raster anschluss steck technik, grating connector technology) connector, and the connector socket is provided with a hinge flap lock or a buckle for ensuring full insertion of the RAST connector and preventing looseness of the RAST connector.

6. The shunt motor according to claim 1, wherein the motor control end is assembled with a coil frame pin of the motor.

7. The shunt motor according to claim 1, wherein the mounting base and the rear cover cooperate to use an inner-guided hidden reverse hook.

8. The shunt motor according to claim 1, wherein the PCB control end is mounted on a side of the detection unit.

\* \* \* \* \*